United States Patent [19]
Hopeck

[11] Patent Number: 5,316,801
[45] Date of Patent: May 31, 1994

[54] ELECTROSTATIC POWDER COATING METHOD FOR INSULATING THE SERIES LOOP CONNECTIONS OF A DYNAMOELECTRIC MACHINE

[75] Inventor: James F. Hopeck, Saratoga, N.Y.

[73] Assignee: General Electric Company, Schenectady, N.Y.

[21] Appl. No.: 981,519

[22] Filed: Nov. 25, 1992

[51] Int. Cl.$^5$ .............................................. B05D 1/06
[52] U.S. Cl. ................................... 427/486; 427/104; 310/45
[58] Field of Search ..................... 427/104, 471, 486; 310/45, 184, 207; 29/598

[56] References Cited

U.S. PATENT DOCUMENTS

| | | | |
|---|---|---|---|
| 3,247,004 | 4/1966 | Dosser | 427/104 |
| 3,901,185 | 8/1975 | Goodridge et al. | 118/630 |
| 3,937,180 | 2/1976 | Wiggins | 118/635 |
| 4,088,809 | 5/1978 | Eibling et al. | 428/379 |
| 4,151,434 | 4/1979 | Zona et al. | 264/219 |
| 4,267,300 | 5/1981 | Guilbert | 528/92 |
| 4,273,798 | 6/1981 | Schieber | 427/27 |
| 4,343,828 | 8/1982 | Smead et al. | 427/483 |
| 4,344,006 | 8/1982 | Mendelsohn | 427/104 |
| 4,723,083 | 2/1988 | Elton | 310/45 |
| 4,724,345 | 2/1988 | Elton et al. | 310/45 |
| 4,990,383 | 2/1991 | Bergstrom et al. | 428/35.9 |
| 5,179,910 | 1/1993 | Habsburg-Lothringen | 118/634 |

FOREIGN PATENT DOCUMENTS

| | | |
|---|---|---|
| 220122A | 4/1987 | European Pat. Off. . |
| 2517504 | 7/1976 | Fed. Rep. of Germany . |
| 48-13762 | 4/1973 | Japan ............................. 427/104 |
| 55-97171 | 7/1980 | Japan . |
| 55-162862 | 12/1980 | Japan . |
| 56-129562 | 10/1981 | Japan . |
| 63-117641 | 5/1988 | Japan . |
| 387438 | 11/1973 | U.S.S.R. . |

OTHER PUBLICATIONS

Ionic Electrostatic Corporation, "Ionic Electrostatic Spray Equipment" (May 1961) brochure.
"Generators for Small and Mid-Size Fossil Fuel Plants" brochure, R. E. Fenton and J. J. Gibney, General Electric Co., GE Turbine Reference Library, Oct. 1988.

Primary Examiner—Terry J. Owens
Attorney, Agent, or Firm—Nixon & Vanderhye

[57] ABSTRACT

An epoxy powder is electrostatically charged and spray-coated onto the series loop connections 16, 18 of a dynamoelectric machine. With the series loop connections grounded, the electrostatically charged particles adhere to the connections and wrap about the front, back and sides of the connections to provide a substantially uniform thickness or build-up of the electrically insulating epoxy powder. With the series loop connections preheated, the epoxy will begin to melt and flow, further ensuring a uniform build-up and thickness about the connections. The spray-coating is then heat-cured, thereby affording electrically insulated series loop connections at the opposite ends of the dynamoelectric machine.

4 Claims, 2 Drawing Sheets

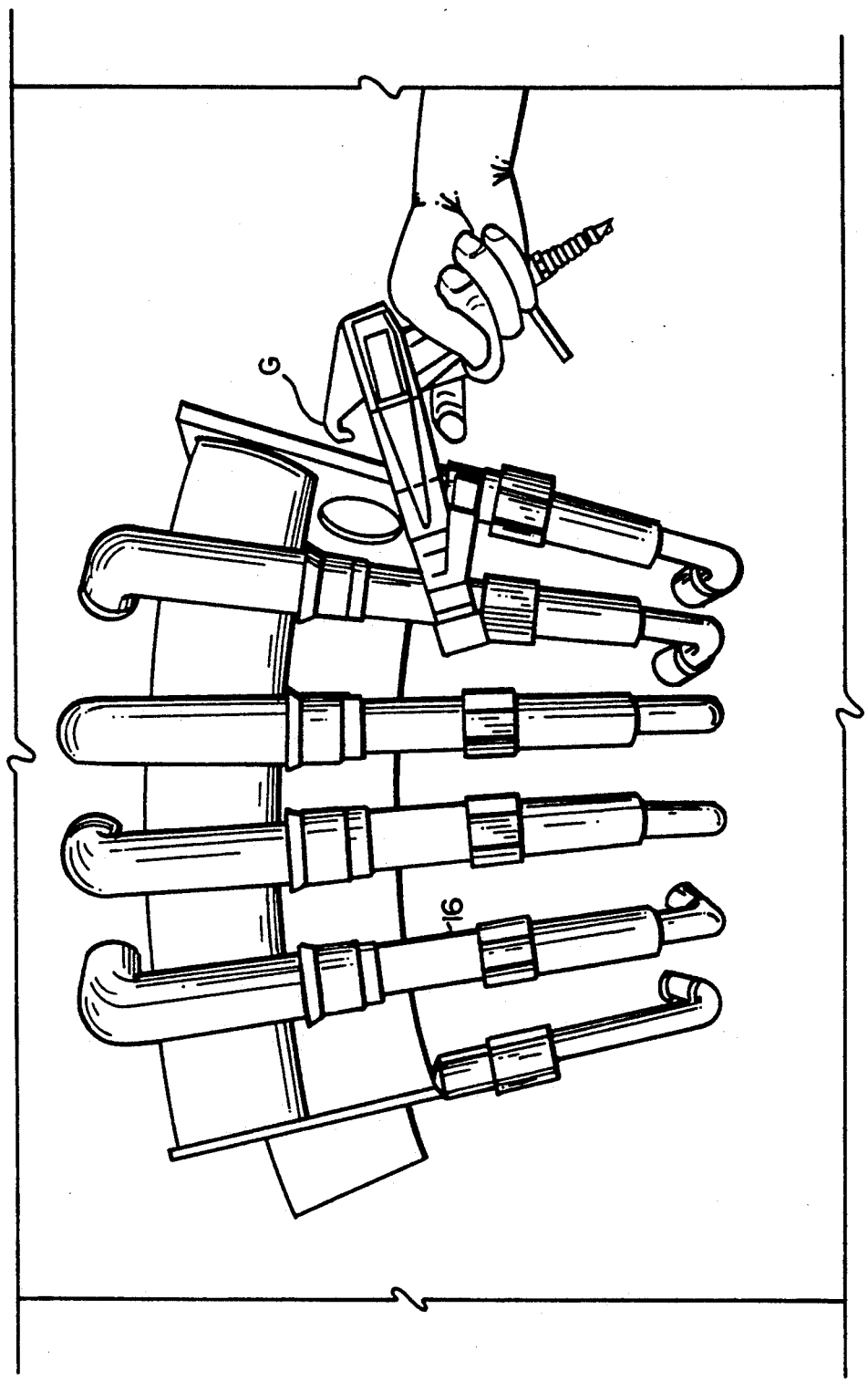

ELECTROSTATIC POWDER COATING METHOD FOR INSULATING THE SERIES LOOP CONNECTIONS OF A DYNAMOELECTRIC MACHINE

TECHNICAL FIELD

The present invention relates to methods for insulating the series loop connections of a dynamoelectric machine and particularly relates to methods for applying an epoxy powder material on the series loop connections to afford an electrically insulating layer.

BACKGROUND

Series loop connections at the opposite ends of a dynamoelectric machine comprise a substantial number of copper elbows, pipes and fittings for conducting electrical current between stator bar ends and connection rings and conducting a cooling medium about the stator bars. These series loop connections in effect form part of the stator windings at the opposite ends of the dynamoelectric machine and require electrical insulation. Additionally, the windings are conventionally cooled, typically with air, hydrogen or deionized water. Conventionally, the deionized water used for cooling purposes is flowed through this end piping, the outside of which is used to flow electrical current constituting the series connections among the stator bars. These series loop connections are very closely spaced relative to one another at the opposite ends of the dynamoelectric machine and to the end faces of the machine.

Previous to the present invention, it has been very difficult to electrically insulate these series connections. Because of the heat required to Braze the joints, i.e., on the order of 1200° to 1400° F., any prior applied electrical insulation would deteriorate because it could not withstand a temperature corresponding to the brazing temperature. Consequently, the series loop connections are always electrically insulated after the dynamoelectric machine is wound and Brazed. To accomplish that, the series connections have previously been taped. Because of the close spacing of these series loop connections, the taping has been performed manually and has required the use of taping hooks. Generally, the individual manually taping the series loop connections cannot fit his hand or the roll of tape between the series connections because of the tight spaces therebetween. Access between and behind the series connections is difficult to obtain. The effort therefore to apply insulation to the series loop connections by taping is very labor-intensive, slow and costly. Another method of insulating the series loop connections comprises applying a plastic insulating cap to each of the series loop connections. The cap, however, requires expensive molds to produce, is not generally used on a water-cooled dynamoelectric electric machine because of the complexity of the cap and still requires a labor-intensive manual assembly effort.

DISCLOSURE OF THE INVENTION

According to the present invention, there is provided a novel and improved method for applying insulating material to the series loop connections of a dynamoelectric machine which is efficient, cost-effective, reliable and may be employed with minimum labor. Particularly, a solid thermoset epoxy powder containing various curing and flow control agents is spray-coated onto the series loop connections by an electrostatic spray-coating system. The powder coating system provides electrically charged powder coating material for spraying on grounded series loop connections. The electrostatic charge on the epoxy powder not only enables the powder to be electrically attracted to the grounded series loop connections but the attraction of the charged epoxy particles to the grounded connections is also sufficiently strong to draw powder to the front, back and sides of the connections to provide the required uniform film thickness or build-up. This electrostatic "wraparound" feature of the present process enables high material utilization and consistent finish characteristics, including uniform insulating thickness build-up, a high-gloss, durability and resilience. Consequently, the spray gun sprays the electrostatically charged epoxy powder coating onto the series loop connections from the front or a side of the loops with the assurance that a uniform coating about each of the connections is provided without the need for access between or behind the connections.

More particularly, the electrostatic powder spray system has a high voltage, low amperage power unit which supplies an electrode at the front of the gun sufficient voltage to emit a field charge which is imparted to the powder material as it is propelled toward the series loop connections. Once charged, the particles are drawn to and attach themselves to the grounded series connection loops. Preferably, the powder coating is built-up to about a mean of 0.018–0.020 inches and has a dielectric strength of about 800 volts per mil, which is sufficient to electrically insulate the series loop connections. Once the coating has been applied to the connections, the epoxy coating may be cured by heating. For example, the entire dynamoelectric machine may be heated within a range of 120°–125° C. over about 2 hours whereby the epoxy coating will flow and cure to provide a uniform coating on the connections. To facilitate obtaining a uniform coating thickness, the series connections may be preheated to approximately 100° C., ±10° C., such that some melting or flowing of the solid epoxy powder occurs upon initial application of the powder to the connections.

In a preferred embodiment according to the present invention, there is provided a method of electrically insulating the series loop connections of a dynamoelectric machine comprising the steps of electrically grounding the series loop connections, spraying an electrostatically charged epoxy powder on the series loop connections to form a layer of insulation thereon to a predetermined thickness and curing the epoxy powder spray-coated on the series loop connections.

Accordingly, it is a primary object of the present invention to provide a reliable, functional insulation system and procedure for insulating series loop connections for dynamoelectric machines wherein the insulation can be readily and easily applied as a coating of uniform thickness about the connections and at minimum cost.

BRIEF DESCRIPTION OF THE DRAWINGS

FIG. 3 is a fragmentary end view illustrating the series loop connections.

BEST MODE FOR CARRYING OUT THE INVENTION

Reference will now be made in detail to a present preferred embodiment of the invention, an example of which is illustrated in the accompanying drawings.

Figure 1:
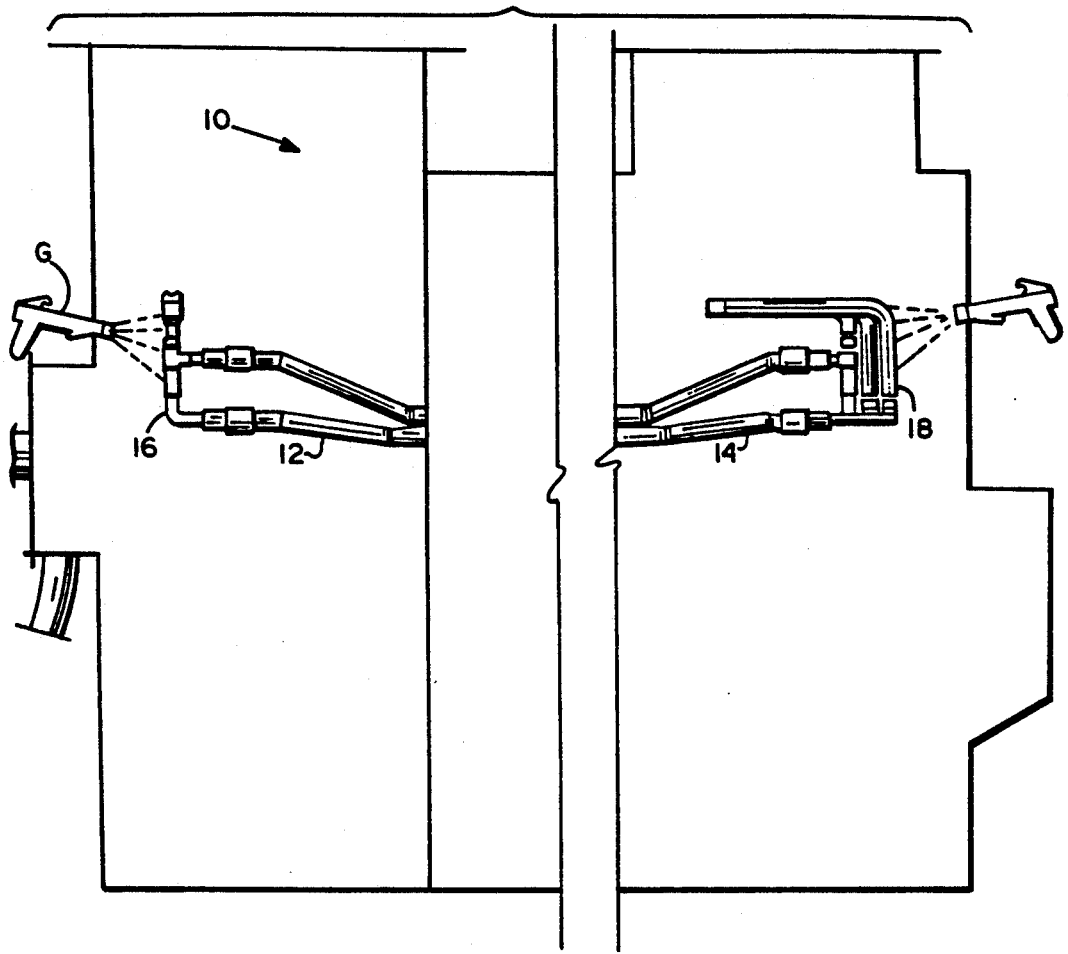
FIG. 1 is a schematic representation of a method of applying an epoxy powder coating to the series loop and circuit ring connections for a liquid-cooled dynamoelectric machine.

Referring now to the drawings, particularly to FIG. 1, there is illustrated a dynamoelectric machine, generally designated 10, having stator bars 12 and 14 projecting from its respective opposite ends and coupled to series loop connections 16 and 18, respectively. As indicated previously, the series loop connections comprise un-insulated copper elbows, pipes and fittings for conducting electrical current and deionized water between the stator bar ends and the connection rings to complete the electrical circuit for motor and generator operation and to cool the stator bars. As best illustrated in FIG. 3, these series loop connections are closely spaced one to the other and limit access between and behind them, thereby inhibiting manual application of insulating materials about the connections.

According to the present invention, a solid thermoset epoxy powder of Bisphenol A epoxy with various curing and flow control agents along with a large percentage, e.g., 30-60% wollastonite, and having high electrical insulating properties is spray-coated onto the series connections. The coating may be an epoxy powder manufactured by Morton International, Reading, Pa., and sold under the product name CORVEL ECB-1363A Red 3330 under Part No. 17-4004. This epoxy powder may be spray-coated onto the series connections by a manual spray gun G manufactured by the Nordson Corporation, Amherst, Ohio, under the trade name Versa-spray TM. Consequently, this powdered epoxy resin is fluidized with air in a feeder system and is provided an electrostatic charge at the gun nozzle. By grounding the series loop connections and directing the gun to spray the electrostatically charged epoxy particles onto the series connections, the particles will be attracted and adhere to the series loop connections. Additionally, the electrostatic charge affords sufficient attraction of the charged epoxy particles to the grounded series loop connections such that the powder will be drawn to the front, back and sides of the connections to provide a uniform film build-up 360° about the connections. That is, the spray gun may be positioned in front of the series loop connections or to either side thereof for spraying the charged epoxy particles onto the connections. Because of the electrostatic attraction, the charged epoxy particles will flow around the connections, including behind and between the connections and between them and the end faces of the dynamoelectric machine to provide a substantially uniform coating about the entire series loop connection surfaces.

In a preferred embodiment of the present invention, the series loop connections are preheated to a temperature of approximately 100° C., ±10° C. By preheating the connections, the epoxy powder applied thereto will immediately start to flow and melt. The epoxy is subsequently heat-cured, for example, for a period of about 2 hours at a temperature of approximately 120°-125° C.

To practice the present invention, the series loop connections are first cleaned of all contaminants, e.g., oil, grease, winding epoxy and dirt. Dynamoelectric machines are typically located within a oven for heat curing other elements of the machine. Thus, the dynamoelectric machine and its series loop connections are preferably preheated in the oven to 100° C., ±10° C. A grounding strap is also connected to the frame of the machine and to the terminal connections.

After the series loop connections have been grounded, the electrostatically charged epoxy particles can be spray-coated on the connections. A preferred coating thickness of approximately 0.018 to 0.020 inches is applied. While a maximum epoxy coating thickness is desirable, the coating is limited by the electrostatic wrap and the insulating quality of the epoxy coating adhered to the surface during the spraying process. For example, when the coating builds up to approximately 0.045 inches, additional charged powder particles cannot overcome the insulating quality of the epoxy powder and will not adhere to the surface of the connections. However, a uniform coating thickness of about 0.018 to 0.020 inches has been found to have sufficient electrical insulating properties for this purpose. After spraying, the epoxy coating is heated to a curing temperature as soon as possible after the powder coating has been applied. During the heat cure of the epoxy, it is important to limit the temperature exposure to no greater than 150° C. It has been found that, for the previously identified material, a heat cure at 120°-125° C. for a period of about two hours is sufficient.

When applying the coating, the voltage should be sufficiently high to provide a substantial deposition rate but not too high such that the electrostatic charge on the powder already deposited on the series loops will tend to repel additional powder. Further, the flow rate air pressure should be sufficiently high to afford an adequate deposition rate but not too high as to decrease the amount of electrostatic wrap. Preferably, low atomizing air pressure will afford a better coverage on the series loop than higher pressures.

Figure 2:
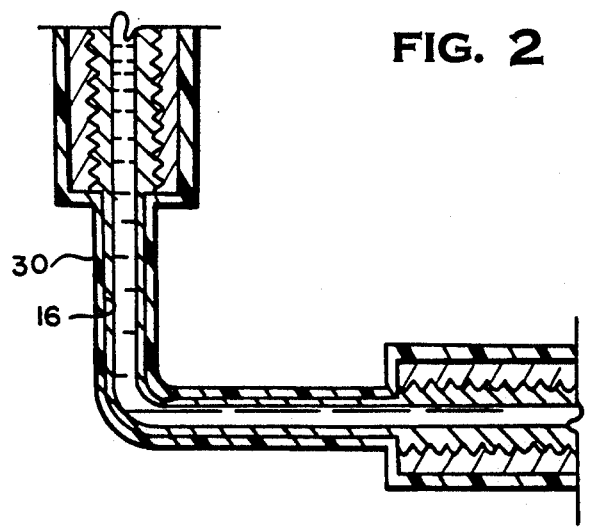
FIG. 2 is an enlarged cross-sectional view of one of the elements of a series loop connections illustrating a cooling water path with the epoxy electrically insulating coating applied about the external surface of the element.

As a result of this process, a uniform insulating coating of cured epoxy is provided, for example, as illustrated at 30 in FIG. 2, about the series loop connections. The powder, because of its charge and by grounding the connections, wraps around the connections to a substantially uniform thickness as illustrated prior to being heat cured. It will therefore be appreciated that, simply by spraying charged powder on the series loop connections, these connections are completely electrically insulated and without requiring the difficult access between and behind the connections.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

I claim:

1. A method of electrically insulating the series loop connections of a dynamoelectric machine comprising the steps of:

electrically grounding the series loop connections;

spraying an electrostatically charged epoxy powder on the series loop connections from a position in front or to either side of the series loop connections enabling the powder to electrostatically wrap about the series loop connections including along the back sides thereof between the series loop connections and an end face of the dynamoelectric machine to form a layer of insulation thereon of a substantially uniform selected thickness about the series loop connections; and curing the epoxy powder spray-coated on the series loop connections.

2. A method according to claim 1 including insulating the frame of the dynamoelectric machine from ground.

3. A method according to claim 1 wherein the step of curing includes heating the series loop connections to cure the coating.

4. A method according to claim 1 including, prior to spraying the powder on the series loop connections, preheating the series loop connections.

* * * * *